United States Patent [19]

Chow

[11] Patent Number: 5,453,903
[45] Date of Patent: Sep. 26, 1995

[54] SUB-CYCLE DIGITAL DISTANCE RELAY

[75] Inventor: Kung C. Chow, Coral Springs, Fla.

[73] Assignee: ABB Power T&D Company, Inc., Blue Bell, Pa.

[21] Appl. No.: 108,910

[22] Filed: Aug. 18, 1993

[51] Int. Cl.$^6$ .................................................. H02H 3/38
[52] U.S. Cl. ................................. 361/79; 361/80
[58] Field of Search .................... 361/78–79, 80, 361/86–89, 90–97; 324/520, 522

[56] References Cited

U.S. PATENT DOCUMENTS

| | | | |
|---|---|---|---|
| 4,107,778 | 8/1978 | Nii et al. | 364/492 |
| 4,321,681 | 3/1982 | Sackin et al. | 364/492 |
| 4,339,802 | 7/1982 | Yamaura et al. | 364/483 |
| 4,455,612 | 6/1984 | Girgis et al. | 364/483 |
| 4,731,689 | 3/1988 | Nimmersjo et al. | 361/66 |
| 4,740,860 | 4/1988 | Fornsel et al. | 361/94 |
| 4,774,621 | 9/1988 | Andow | 361/80 |
| 4,803,635 | 2/1989 | Andow | 364/483 |
| 4,871,971 | 10/1989 | Jeerings et al. | 324/509 |
| 4,878,142 | 10/1989 | Bergman et al. | 361/80 |
| 4,937,769 | 6/1990 | Verbanets | 364/574 |
| 4,972,290 | 11/1990 | Sun et al. | 361/64 |
| 5,072,403 | 12/1991 | Johns | 364/492 |
| 5,345,409 | 9/1994 | McGrath et al. | 364/736 |

Primary Examiner—A. D. Pellinen
Assistant Examiner—Michael Sherry
Attorney, Agent, or Firm—Woodcock, Washburn, Kurtz, Mackiewicz & Norris

[57] ABSTRACT

A sub-cycle digital distance relay which uses only the first N/2 samples after a fault to calculate the distance to the fault using a Full Cycle Fourier Algorithm which operates on N samples, where N is the number of samples taken in a cycle of the power signal. The DC offset in the first N/2 samples taken after detection of the fault is cancelled using the N/2+1 sample taken after detection of the fault. The resulting DC adjusted N/2 samples are then multiplied by −1 in order to take advantage of the symmetry of the sine wave of the power signal in estimating the remaining N/2 samples of the first cycle of the power signal after detection of the fault. By so calculating N/2 artificial samples from the first N/2 actual samples taken after the fault, the digital distance relay of the invention can estimate the distance to the fault and thus provide a reliable trip signal in less than one cycle of the power signal. The technique of the invention is used to implement a high-speed tripping mode for use in conjunction with conventional tripping schemes to provide a more reliable tripping signal in a minimum amount of time after the detection of the fault, thereby providing improved fault protection for the power transmission components.

18 Claims, 5 Drawing Sheets

SUB-CYCLE DIGITAL DISTANCE RELAY

BACKGROUND OF THE INVENTION

1. Field of the Invention

The present invention relates to a digital distance relay which can determine in less than one cycle of the power line signal whether a circuit breaker needs to be tripped for purposes of fault protection. In particular, the present invention relates to a digital distance relay which uses sample N/2+1 of the power line signal taken after detection of a fault to cancel the DC offset in the first N/2 samples of the power line signal taken after detection of the fault, where N is the number of samples taken per cycle of the power line signal, and then uses the DC compensated N/2 samples to calculate the N/2 samples expected in the latter half of the current cycle of the power line signal. The N/2 actual samples and N/2 calculated samples are then provided to a Full Cycle Fourier Algorithm for a determination of whether the detected fault is in the protection zone of the circuit breaker and hence whether the circuit breaker needs to be tripped to protect the AC electric power transmission line system from the fault.

2. Description of the Prior Art

As well known by those skilled in the art, AC electric power generating systems are typically interconnected in a complex power grid by high voltage alternating current (AC) three-phase electric power transmission lines. Faults occur on the transmission lines when a conductor wire breaks and falls to the ground or when the conductors short-circuit together. In the event of such faults, the power grid is provided with circuit breakers for disconnecting the faulted section of the transmission line in order to protect the power line equipment. When properly controlled by a digital distance relay or a distance-relaying computer, the faulted section, and only that section, is promptly disconnected from the power grid to avoid unnecessary interruptions of service to the electric power consumers and to prevent a power blackout from extending over an unnecessarily large geographic region.

Digital distance relays protect AC electric power transmission systems from faults by providing trip signals to the circuit breakers in the protection zones of the circuit breakers. In general, it is desired that the digital distance relay provide a trip signal to the circuit breaker as early as possible in the first AC cycle after the inception of the fault without sacrificing the accuracy of determining the protection zone in which the fault occurred so that damage to the power transmission equipment can be avoided. However, the determination of whether the detected fault is in the protection zone of the associated circuit breaker typically requires a complex determination of impedance variations on the power transmission lines, which, in turn, requires at least one cycle of sample data of the AC electric power cycle before a reliable distance determination can be made.

Digital distance relays typically sample the line currents and voltages from the three phases of a transmission line and detect a fault when there is an unusual departure of the sample values from the expected values. Once a fault is detected, post-fault voltage and current samples are taken for use in calculating the distance from the relay to the fault. Unfortunately, these samples are typically corrupted by noise and transient behavior in the first post-fault cycle of the power line signal, thereby limiting the speed with which the steady-state sinusoidal waveform of the power line signal can be identified for use in making accurate impedance calculations for determining where along the transmission line the fault occurred. The sooner accurate impedance calculations can be made, the sooner the faulted line section can be accurately identified.

FIG. 1 illustrates a generic prior art digital distance relaying system for detecting a fault in a three-phase electric power transmission line and appropriately tripping a circuit breaker in the event the fault is determined to be in the protection zone of that circuit breaker. In particular, FIG. 1 illustrates a portion of a three-phase 60 Hz electric power grid comprising a three-phase transmission line having conductors A, B and C which are fault protected by a digital distance relay. Electric power network 100 includes the electrical generation and transmission equipment to the left of transformer 102 and is represented as an equivalent circuit including an equivalent generator 100. Network 100 delivers electric power to transformer 102 and to AC electric power lines A, B and C as illustrated. When a fault F occurs at some point along transmission lines A, B and/or C, circuit breaker 104 is promptly tripped to disconnect transmission lines A, B and C from network 100. For this purpose, current transformers 106 and potential (voltage) transformers 108 are provided for respectively monitoring the current and voltage on each of the power transmission lines A, B and C.

The currents of the respective power lines A, B and C ($I_A$, $I_B$, and $I_C$) are provided to low pass analog filter 110 to prevent aliasing. Similarly, the power line to ground voltages $V_{AG}$, $V_{BG}$, and $V_{CG}$ of the respective power lines A, B, and C are provided to low pass analog filter 112 to prevent aliasing. The filtered signals from low pass analog filters 110 and 112 are then converted to digital form by respective A/D converters 114 and 116 and then provided to computer 118 where the digital values are stored in data buffers for processing. Of course, a single A/D converter with an appropriately sized single data buffer may be used for this purpose.

Computer 118 processes the received digital data to determine from the received data whether the fault occurred in the protection zone of the circuit breaker 104 and, if so, to provide a trip signal to circuit breaker 104. Typically, computer 118 comprises a suitable minicomputer or microprocessor architecture having sufficient operating speed and memory capacity to calculate the impedance of the transmission line from the point of the relay to the fault location as required for the protective relay function in accordance with known impedance distance relaying techniques. Additional memory 120 may be provided for storing programs and/or additional data for use by computer 118.

Different techniques for detecting the presence of a fault in the protection zone of the circuit breaker 104 have been implemented in the prior art. As noted above, a typical prior art technique includes detecting faults based upon changes in voltage and/or current values on the three-phase power lines. Once a fault has been detected, a suitable algorithm is implemented to determine impedance variations on the power lines to thereby determine the distance from the relay to the fault. Many algorithms have been implemented for this purpose. For example, a Fourier transform technique is widely used in which a "window" of data sampled after the fault is processed to determine whether the fault is in the protection zone of the associated circuit breaker. The sampling of the steady-state post-fault voltage and current sinusoids typically begins as soon as possible after the fault. Then, once a "window" of samples sufficient to represent a full cycle of the power line signal is obtained, the data is processed in accordance with a well-known Fourier transform technique to provide an estimate of the distance from the circuit breaker to the fault. Although quite accurate, this technique requires at least a full cycle of post-fault samples to generate a trip signal. It is desired to shorten this time period to minimize fault current damage.

A protective relay system of the type illustrated in FIG. 1 is described by Girgis et al. in U.S. Pat. No. 4,455,612. Girgis et al. implement a recursive estimation technique on computer 118 which allegedly provides an accurate estimation of the post-fault voltage and current phasors so that a trip signal can be provided during the first post-fault electrical cycle, even though the line voltage and currents are typically affected by noise transients. Since the steady-state information is desired during the first cycle after the fault (before the noise transient has decayed), the steady-state waveforms must be estimated. Girgis et al. do this with a digital distance relay which responds to each post-fault sample as it arrives to recursively electronically estimate a waveform including the steady-state voltage and current sinusoids before the next voltage or current sample arrives. For this purpose, a state variable approach having no "window" length requirements is used. The recursive nature of the method permits an updated estimate to be made utilizing the latest sample of data and the previous estimate, thereby utilizing all of the information in all previous post-fault samples without repeating the earlier calculations. Such a technique purports to provide relaying within the first half of the post-fault electrical cycle for most Zone 1 faults. However, several microprocessors are necessary for each relay in order to implement the recursive algorithm described by Girgis et al. and, accordingly, such a technique is very expensive to implement in practice.

Another protective relay system of the type illustrated in FIG. 1 is described by Sackin et al. in U.S. Pat. No. 4,321,681. In that system, the outputs of two separate algorithms operated on computer 118 are logically related to provide the fastest possible trip depending upon the noise transient conditions of the post-fault voltage and current waveforms. The first algorithm is the aforementioned Full Cycle Fourier algorithm which provides accurate results notwithstanding severe waveform distortion but requires a full cycle or "window" of sample data. To increase tripping speed in the event that the fault is close to the relay and/or there are few noise transients after the fault, Sackin et al. also implement a mathematical algorithm which requires as few as three samples to predict the peak of the current sinusoid by using the first and second derivatives of the sampled values. Thus, the algorithm has an aperture or data window of three samples. However, in order to correctly predict fault current magnitude using this algorithm, the three consecutive samples must follow the fault inception point and make a trip/no-trip decision based upon this data. Unfortunately, the fault waveforms immediately after the fault inception point are seldom pure sinusolds since they are affected by the aforementioned noise transients. In practice, the fault waveforms are usually distorted to include a DC offset transient which may have a magnitude as large as the fault current peak. Moreover, line reactance prevents an instantaneous change in current from load to fault value, creating a decaying exponential DC transient as the system changes from a pre-fault steady-state condition to a post-fault steady-state condition. The voltage and current waveforms may also include other types of distortions such as harmonics, transients, and other high frequency noise such as that caused by non-linear elements, surge reflections, current transformer saturation, and the like. As a result, the mathematical algorithm which makes its decision after three data samples can seldom be used to produce accurate results. Accordingly, even though the protective relay apparatus disclosed by Sackin et al. uses the Fourier algorithm and three sample algorithm in a complementary manner, the disclosed apparatus usually must process a full cycle of data before a reliable trip signal can be provided.

Other prior art systems have implemented some sort of post-algorithm averaging or filtering in order to stabilize the output signals to provide data from which intelligent trip/ no-trip decisions may be made. However, this typically requires many more samples to be taken before a post-fault steady-state calculation may be reached, thereby extending the data window and thus the time following fault inception before an accurate trip/no-trip decision may be made. Indeed, prior art Fourier and Walsh type algorithms have been developed in which the digital data is digitally filtered in the algorithm itself so as to provide band pass characteristics central about a power frequency and to provide a steady-state, accurate impedance calculation using one full cycle of samples following fault inception. However, as noted above, these algorithms require a data window equal to one full power frequency cycle. It is desired to shorten this time period to minimize the possibility of damage to the power transmission circuitry.

FIG. 2 illustrates yet another digital distance relay algorithm which may be implemented on computer 118. In particular, FIG. 2 illustrates a prior art MDAR digital distance relay currently used by the assignee of the present invention. The illustrated algorithm has a typical trip time of approximately 1.5 cycles and a maximum trip time of two cycles for Zone 1 and pilot operations. One cycle is required to implement the full cycle Fourier algorithm, while the additional time is required for digital filtering and the tripping relay delay. However, for a very close-in fault, the MDAR's trip time may be reduced to less than one cycle by implementing a "Restrict" mode in which a half cycle of data sampled before the fault and a half cycle of data sampled after the fault are used to fill the data window of the Full Cycle Fourier Algorithm. The Fourier algorithm then computes the one cycle sum-of-squares and Fourier sums. However, the transformer in-rush DC offset and the solid-state (analog) circuit's offset are not filtered out, and as a result, a severe overreach cannot be avoided.

The algorithm illustrated in FIG. 2 (to be described in more detail below) provides two paths or modes for tripping upon detection of Zone 1 faults: a restrict mode for rapid tripping for very close-in faults and the standard mode for implementing the Full Cycle Fourier Algorithm. As just noted, the restrict mode is used for very close-in faults, while the standard mode is used for a more accurate calculation of the distance to all other faults. In the standard mode, the first and second samples after the fault condition is detected are discarded in order to avoid the error due to the low-pass anti-aliasing filter. Thus, if eight samples are taken during each cycle of the power signal waveform, samples #3 to #10 after the fault are used for the first fault calculation. The Full Cycle Fourier Algorithm extracts the fundamental power line frequency phasor components from these eight current and voltage samples. The eight samples per cycle are required to define a given vector, and preferably, the Full Cycle Fourier Algorithm filters out the DC component automatically. As noted above, this technique is quite accurate, but unfortunately, it has a trip time of approximately 23 milliseconds for a 60 Hz transmission system (2 samples for the filter, 8 samples for the calculation, and 2 milliseconds for tripping relay delay) and is the fastest speed that the relay can achieve in the system illustrated in FIG. 2. It is desired that an accurate trip/no-trip determination be made in less than 1 cycle of the power line signal in order to minimize damage to the power transmission components. In particular, a faster and more reliable technique for generating a "window" of samples for use by the Fourier algorithm is desired. The present invention has been designed for this purpose.

SUMMARY OF THE INVENTION

The present inventor has solved the above-mentioned problems in the art by implementing another fault path or mode in parallel with the other paths in which a full cycle of data samples for the Full Cycle Fourier Algorithm is calculated from a half cycle of post-fault samples. In particular, the present inventor has recognized that the symmetry of sine waves permits the first half of the sine wave determined from actual data samples to be used to estimate the second half of the sine wave by multiplying the actual samples taken during the first half of the cycle by −1 once the samples have been DC offset compensated. As a result, in a system where eight samples per cycle are taken (N=8), the current or voltage vector can be determined using only five samples (N/2+1) so that the trip time may be reduced to approximately 14 milliseconds for a 60 Hertz system. Thus, the speed of the MDAR relay can be improved from 1.5 cycles to 1 cycle with no deterioration of overreach. The speed of the relay can be further improved by increasing the sample rate from 8 to 16 samples per cycle, and the delay of the anti-aliasing filter can be reduced by increasing its frequency from, for example, 240 to 480 Hertz. The present invention thus provides the first realistic model for a digital distance relay which provides a reliable trip signal in less than one cycle.

A preferred embodiment of the present invention thus relates to a protective relay apparatus which provides a trip signal to a circuit breaker on a three-phase electrical power transmission line in an. AC electrical power transmission system when a fault is detected in a protection zone of the circuit breaker. In accordance with the invention, such a protective relay apparatus comprises sampling means for providing voltage and current samples $A(1)$ to $A(N)$ for each cycle of a power signal on the transmission line and a processor responsive to the voltage and current samples $A(1)$ to $A(N)$ for determining whether the fault is in the protection zone and hence whether the circuit breaker should be tripped. The processor of the invention implements a Full Cycle Fourier Algorithm which extracts the fundamental power line frequency phasor components from those voltage and current samples $A(1)$ to $A(N)$ sampled by the sampling means after detection of the fault. However, the processor of the invention is characterized in that it includes means responsive to the sampling means for (1) providing samples $A(1)$ to $A(N/2)$ sampled by the sampling means after detection of the fault to the Full Cycle Fourier Algorithm as samples $A(1)$ to $A(N/2)$, (2) calculating artificial samples $A(N/2+1)$ to $A(N)$ in accordance with the equation: $A(k)=(-1) * A(k-N/2)$, $k=N/2+1$ to $N$, and (3) providing the artificial samples $A(N/2+1)$ to $A(N)$ to the Full Cycle Fourier Algorithm as samples $A(N/2+1)$ to $A(N)$. As a result of this calculation of the $N/2+1$ to $N$ samples from samples 1 to $N/2$, the processor of the invention can provide the trip signal to the circuit breaker in less than a full cycle of the power signal after detection of the inception of a fault in the protection zone of the circuit breaker.

The processor of the invention operates in background and fault modes, where the background mode is the normal operating mode when no fault is present and the fault mode is entered into by the processor when the processor detects a current or voltage disturbance on the transmission line. During the background mode, the processor compares voltage and current samples $A(k+N)$ for a current cycle of the power signal with voltage and current samples $A(k)$ for a previous cycle of the power signal and determines whether a difference therebetween exceeds a predetermined threshold. If so, the processor determines that a fault is present on the transmission line and immediately enters the fault mode. Once in the fault mode, the processor will remain in the fault mode for at least three successive cycles of the power signal in order to implement the Full Cycle Fourier Algorithm to determine whether the fault detected in the background mode is within the protection zone of the circuit breaker.

In the fault mode, the processor operates in three separate modes. In a restrict mode, the processor determines whether the fault is close to the circuit breaker along the transmission line by implementing the Full Cycle Fourier Algorithm using $N/2$ voltage and current samples taken by the sampling means immediately before detection of the fault and $N/2$ voltage and current samples taken by the sampling means immediately after the fault. The trip signal is output if the fault is determined by the Full Cycle Fourier Algorithm to be in the protection zone. In a standard mode, on the other hand, the processor determines whether the fault is in the protection zone by implementing the Full Cycle Fourier Algorithm using the voltage and current samples $A(1)$ to $A(N)$ sampled by the sampling means after detection of the fault and outputs the trip signal if the fault is determined by the Full Cycle Fourier Algorithm to be in the protection zone. Finally, in a high speed mode in accordance with the invention, the processor determines whether the fault is in the protection zone by implementing the Full Cycle Fourier Algorithm using the voltage and current samples $A(1)$ to $A(N/2)$ sampled by the sampling means after detection of the fault and the artificial samples $A(N/2+1)$ to $A(N)$ calculated from the voltage and current samples $A(1)$ to $A(N/2)$ and outputs the trip signal if the fault is determined by the Full Cycle Fourier Algorithm to be in the protection zone. Preferably, the processor operates concurrently in the restrict, high speed and standard modes by implementing plural versions of the Full Cycle Fourier Algorithm in parallel.

In accordance with another aspect of the invention, the processor calculates a DC offset component Ado for each voltage and current sample $A(k)$, prior to calculation of the artificial samples $A(N/2+1)$ to $A(N)$, in accordance with the equation $A_{dc}=A(1)-[A(1)-A(N/2+t)]/2$. A DC adjusted value for each voltage and current sample $A(k)$ thus equals $A(k)-A_{dc}$, where $k=1$ to $N/2$. The Full Cycle Fourier Algorithm then calculates a phasor $P=P_c+jP_s$ from the DC adjusted values in accordance with the following equations:

$$P_S = \frac{4}{N} \sum_{K=1}^{\frac{N}{2}} \left[ P_K - \left( P_1 - \frac{P_1 - P_{N/2+1}}{2} \right) \right] \text{SIN}\left( \frac{\pi \cdot K}{N/2} \right)$$

$$P_C = \frac{4}{N} \sum_{K=1}^{\frac{N}{2}} \left[ P_K - \left( P_1 - \frac{P_1 - P_{N/2+1}}{2} \right) \right] \text{COS}\left( \frac{\pi \cdot K}{N/2} \right)$$

where P represents each phase of current and voltage of the three-phase electrical power transmission line in the AC electrical power transmission system.

The scope of the invention further includes a method of digital distance relaying on a three-phase electrical power transmission line in an AC electrical power transmission system. Such a method in accordance with the invention preferably comprises the steps of:

successively sampling a voltage waveform and a current waveform to obtain samples V(1) to V(N) and I(1) to I(N), respectively, for each cycle of a power signal on the transmission line;

electronically detecting the existence of a fault on the transmission line in a background mode from the samples V(1) to V(N) and I(1) to I(N);

upon detection of a fault in the fault detecting step, determining in a fault mode whether the fault is in a protection zone of a circuit breaker of the AC electrical power transmission system by extracting the fundamental power line frequency phasor components from those voltage samples V(1) to V(N) and current samples I(1) to I(N) sampled after detection of the fault in the fault detecting step, comprising the steps of:

providing samples V(1) to V(N/2) and I(1) to I(N/2) sampled after detection of the fault to respective Full Cycle Fourier Algorithms as samples A(1) to A(N/2), calculating artificial samples V(N/2+1) to V(N) and I(N/2+1) to I(N) in accordance with the equations: V(k)= (−1) * V(k-N/2) and I(k)=(−1) * I(k-N/2), where k=N/2+1 to N, and providing the artificial samples V(N/2+1) to V(N) and I (N/2+1) to I (N) to the respective Full Cycle Fourier Algorithms as samples A(N/2+1) to A(N), and running the respective Full Cycle Fourier Algorithms with the samples A(1) to A(N); and providing a trip signal to the circuit breaker when at least one of the respective Full Cycle Fourier Algorithms determine that the fault occurred in the protection zone.

In accordance with the invention, the fault detecting step preferably comprises the steps of comparing voltage samples V(k+N) and current samples I(k+N) for a current cycle of the power signal with voltage samples V(k) and current samples I(k) for a previous cycle of the power signal and determining whether a difference therebetween exceeds a predetermined threshold. If so, the fault mode is entered. In the fault mode, the Full Cycle Fourier algorithm is implemented in the restrict mode, the standard mode or the high speed mode as described above.

The step of determining whether the fault is in the protection zone may also comprise the step of calculating the DC voltage offset component $V_{dc}$ for each voltage sample V(k) and a dc current offset component $I_{dc}$ for each current sample I(k), prior to calculation of the artificial samples V(N/2+1) to V(N) and I(N/2+1) to I(N), in accordance with the equations $V_{dc}$= V(1)–IV1l) -V(N/2+1)]/2 and $I_{dc}$=I (1) - [I (1) -I (N/2+1)]/2. Thus, the DC adjusted value for each voltage sample V(k) equals V(k)-$V_{dc}$ and for each current sample I (k) equals I (k)-$I_{dc}$, where k=1 to N/2. The phasor vales for the voltage and current may then be calculated using the equations for $P_c$ and $P_s$ above by substituting $V_c$ or $I_c$ and $V_s$ or $I_s$, respectively.

BRIEF DESCRIPTION OF THE DRAWINGS

The above and other objects and advantages of the invention will become more apparent and more readily appreciated from the following detailed description of the presently preferred exemplary embodiment of the invention taken in conjunction with the accompanying drawings, of which.

DETAILED DESCRIPTION OF THE PRESENTLY PREFERRED EMBODIMENT

A system and method which affords the above-mentioned and other beneficial features in accordance with a presently preferred exemplary embodiment of the invention will be described below with reference to FIGS. 2–5. Although the invention is described here in conjunction with a particular embodiment, those skilled in the art will appreciate that the principles of the invention are not limited to the particular embodiment described. Moreover, those skilled in the art will appreciate that the description given herein is for explanatory purposes only and is not intended in any way to limit the scope of the invention. All questions regarding the scope of the invention made be resolved by referring to the appended claims.

Figure 1:
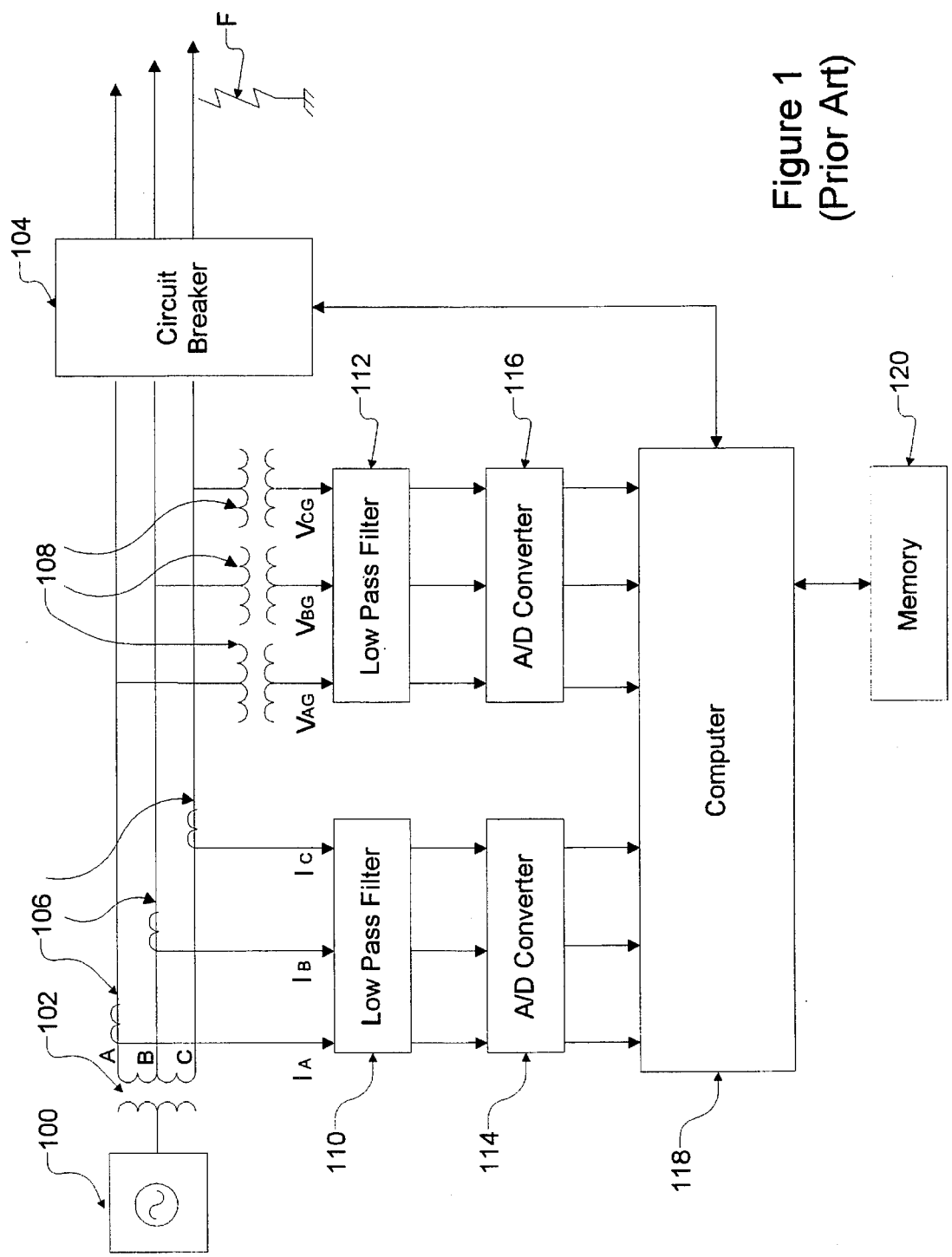
FIG. 1 illustrates a generic prior art digital distance relaying system for detecting a fault in a three-phase electric power transmission line and appropriately tripping a circuit breaker in the event the fault is determined to be in the protection zone of that circuit breaker.
Figure 3:
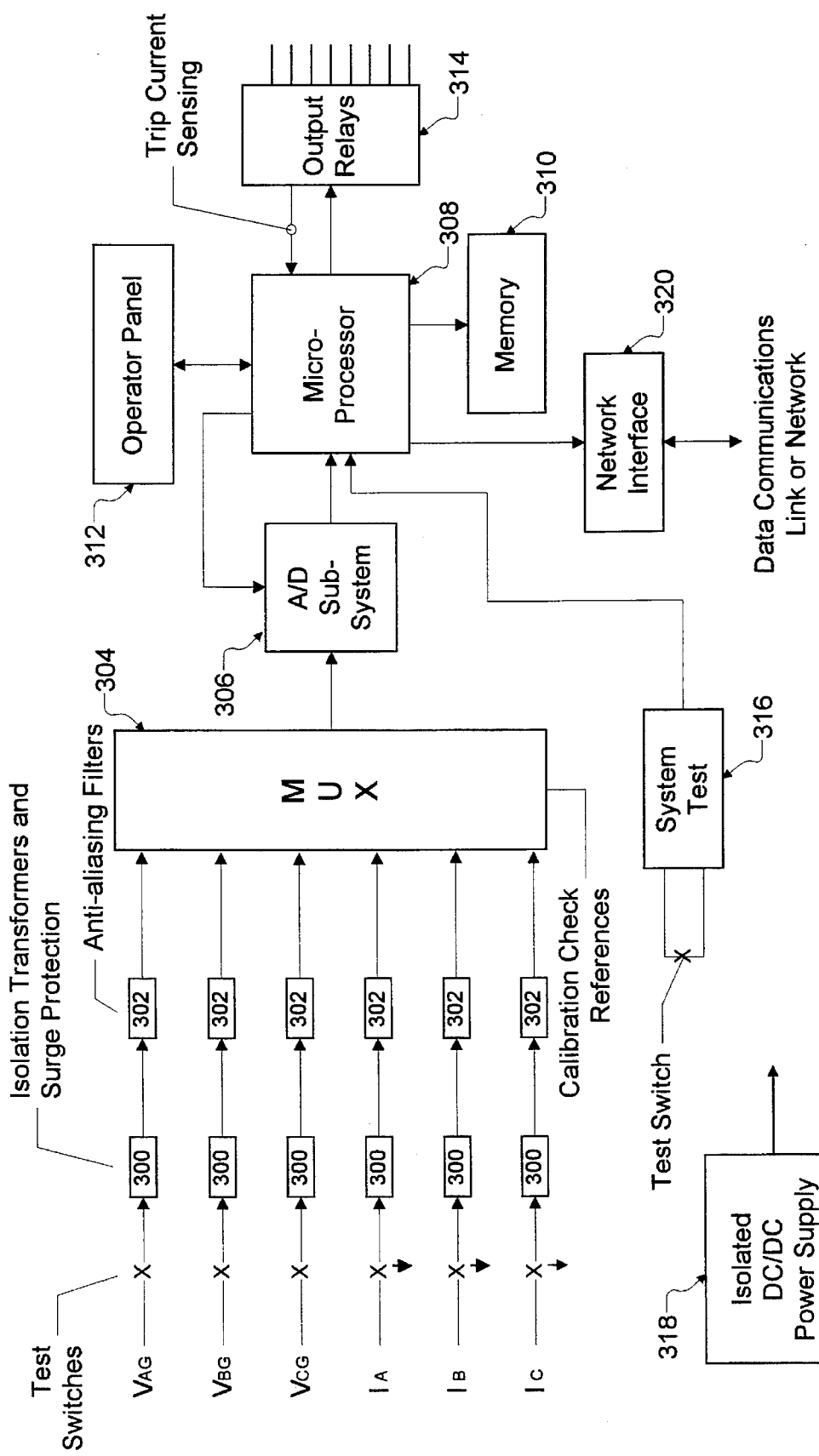
FIG. 3 illustrates an improved MDAR digital distance relay in accordance with the invention.

FIG. 3 illustrates an improved MDAR digital distance relay in accordance with the invention. As illustrated, the three-phase analog voltage values $V_{AG}$, $V_{BG}$, and $V_{CG}$ and analog current values $I_A$, $I_B$, and $I_C$ are provided through test switches to respective isolation transformers and surge protectors 300. The analog voltage and current signals are then passed through anti-aliasing filters 302 before being input into a multiplexer 304. Multiplexer 304 also receives calibration check references so that calibration of the system is maintained. Multiplexer 304 provides the respective analog input values to A/D subsystem 306 which converts the analog signals into digital form for processing by a microprocessor 308. Microprocessor 308 implements the algorithms for detecting a fault and determining the distance to a fault in accordance with the invention, as will be described below. Microprocessor 308 may also have extra memory 310 for storing the processing algorithms or extra data for processing. The user interfaces with the microprocessor 308 via operator panel 312 as illustrated. As noted above with respect to FIG. 1, the output of microprocessor 308 is used to control relays such as output relays 314 for fault protection of the power transmission system.

Microprocessor 308 may be tested via a system test function 316 by activating a test switch. Microprocessor 308 receives its power from an isolated DC/DC power supply 318 so that operation of the microprocessor 308 is independent of the AC electrical power system which the MDAR digital distance relay of FIG. 3 is designed to protect. Finally, in a preferred embodiment of the invention, microprocessor 308 communicates with a communications network via a network interface 320 so that the operation of the MDAR relay may be remotely monitored and controlled in accordance with the technique described by Sun et al. in U.S. Pat. No. 4,972,290, also assigned to the present assignee. For example, network interface 320 may comprise an RS-232C interface to a digital communications network of the type described in the Sun et al. patent.

Microprocessor 308 implements the fault detection and fault protection algorithms of the invention. As noted above, the algorithm of FIG. 2 illustrates the flow chart of the MDAR system software of the prior art MDAR digital distance relay developed by the present assignee. Since many of the features of the improved algorithm of the invention are shared with the prior art algorithm of FIG. 2, the operation of the algorithm of FIG. 2 will first be described in detail before the improvements thereto will be described with respect to FIG. 4.

Figure 2:
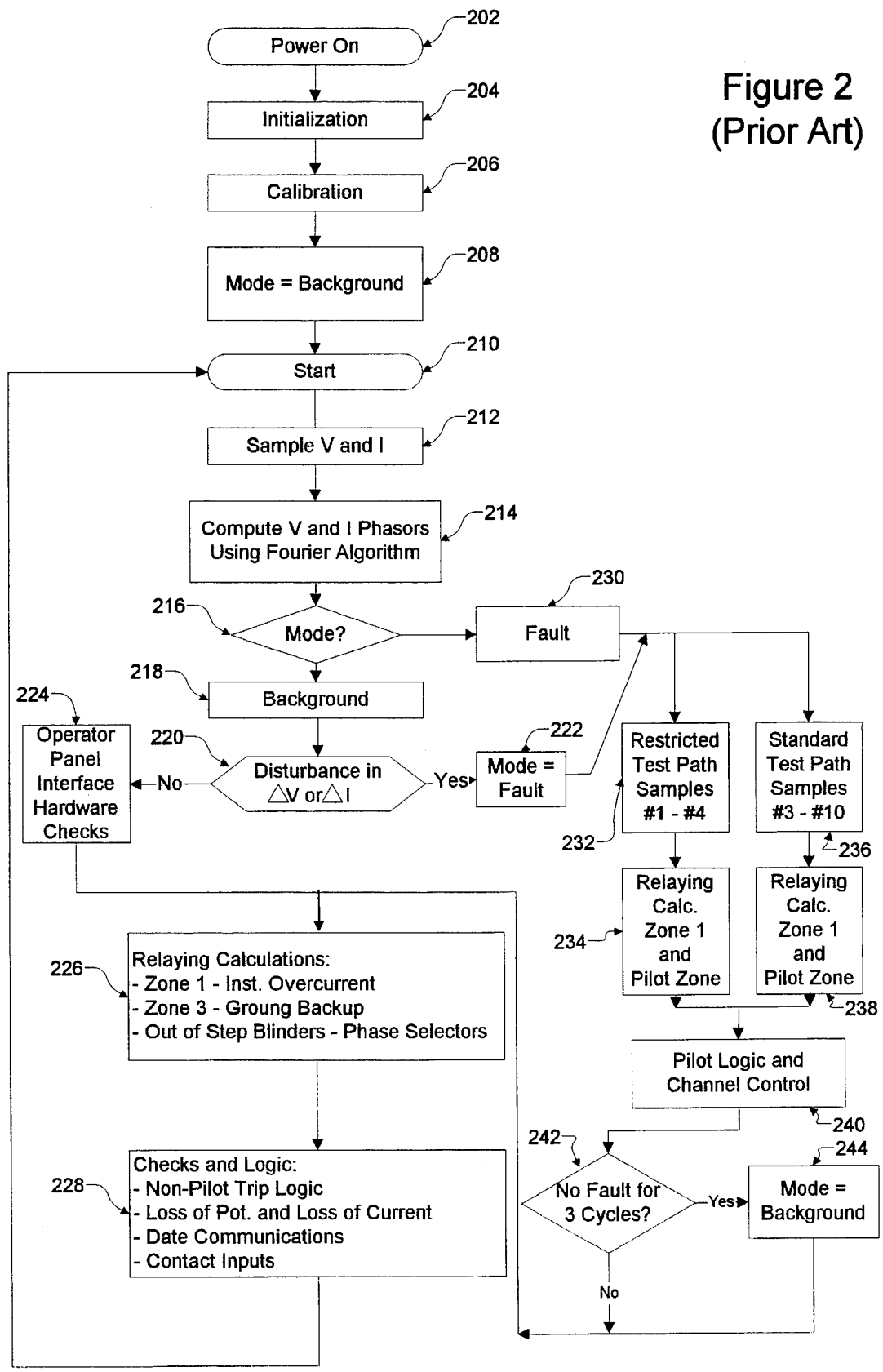
FIG. 2 illustrates a prior art algorithm which may be implemented in the embodiment in FIG. 1 in order to trip the circuit breaker an average of 1.5 cycles after the detection of a fault on the transmission line.

The MDAR system software implemented on microprocessor 308 in a preferred embodiment has been written in 80C196 assembly language and consists of 29 modules of software which occupy approximately 40 Kbytes of EPROM memory. A top level flow chart of the algorithm implemented by the present assignee in current products is illustrated in FIG. 2. The timing and software design of the system is based on a power line frequency of 60 Hz or 50 Hz. The analog inputs are continuously sampled 8 times per power line cycle to provide the time base for the MDAR system. However, those skilled in the art will appreciate that 12, 16, 32 and other sample per cycle systems may be used in accordance with the invention. The first activity of each sample period is the sampling of the analog inputs and the computation of the Fourier and sum-of-squares components. The remainder of the activity for each sample period is determined by the mode of operation (background or fault mode) and which sample of the sample period is being processed. The sample period is defined as ⅛ of a power line cycle which is 2083 microseconds for a 60 Hz application and 2500 microseconds for a 50 Hz application. The portion of the software allocated to each sample period is thus designed to complete execution within 2083 microseconds to ensure that no sampling skew is introduced.

The MDAR software illustrated in FIG. 2 has an internal mode of operation which is generally controlled by the status of the protected transmission line. There are three normal software modes: initialization mode which is maintained for one cycle after the MDAR relay is energized or reset; background mode which is the normal operating mode; and fault mode which handles high-speed tripping of the circuit breaker. Calibration mode is the fourth mode of operation which is entered after initialization mode in certain circumstances.

During operation of the MDAR digital distance relay, the algorithm of prior art FIG. 2 is powered on at step 202 and then initialized at step 204 by an initialization routine. All microcomputer input and output pins and internal control registers of the relay are initialized. The system self-tests are performed, and if any failures are detected, the failure alarm relay is de-energized and the failure code is displayed to the operator. Upon successful completion of the initialization routine, the algorithm jumps to the initial cycle data sampling routine where input signal processing begins. The system remains in the initialization mode for the first cycle of data collection since one full cycle of data is required for comparison of the individual samples and full cycle sums of the input current and voltages. No tripping may occur during this cycle.

After initialization at step 204, calibration may be optionally performed at step 206 for factory testing and calibration of the MDAR relaying system. After calibration, the MDAR relay enters the background mode at step 208, which is the normal operating mode when no fault is present. Background mode processing starts at step 210, and the MDAR relay looks for phase current or phase voltage disturbances by sampling the input currents and voltages at step 212 and then calculating the current and voltage RMS and phasor values at step 214. The RMS values and the current and voltage phasors are updated once a cycle of the power line signal. The values from the previous cycle are operated on while the present cycle of data is being collected. At step 216, the algorithm checks to see if the relay is in the background mode (step 218) or fault mode (step 230). If the relay is in the background mode, it is determined at step 220 whether there is a phase disturbance in the sampled voltage or current by comparing each sampled value of voltage and current to the corresponding sampled values from the previous cycle. If the difference exceeds a predetermined threshold, a fault is suspected and the MDAR relay enters the fault mode at step 222 for several cycles of the power signal to perform phase and ground checks for each zone and function. On the other hand, when no disturbance is detected, the MDAR relay uses its spare time to check its hardware, service the operator panel, and check for disturbances in voltage or current which may indicate a possible fault (step 224). Other relaying calculations are then performed at step 226 and other checks and logic evaluations are performed at step 228 before the background mode loop is repeated at step 210.

Several functions are performed only in the background mode. The servicing of the operator interface is one of these functions. For example, the display is updated, push-buttons are acknowledged, and LEDs are controlled. Metering of the analog inputs, updating the target information for display purposes, and checking the validity of the settings in the nonvolatile memory are other functions performed only in the Background Mode. However, distance protection for Zone 2 and Zone 3 time delay faults may occur in either the background mode or fault mode. The impedance calculation for Zone 2 and Zone 3 faults will be performed once every cycle in the fault mode and in the background mode. In addition, instantaneous overcurrent, inverse time overcurrent protection, and out-of-step blocking may be conducted during both the fault mode and background mode.

Thus, during the background mode the current and voltage inputs are sampled and converted into digital quantities to test for line faults. All signal processing takes place in microprocessor 308. The system continues to sample the power line signal and to extract the 60 Hz components of the signals which comprise the power system frequency and to convert the extracted values to voltage and current phasors using a Fourier notch filter algorithm operating on microprocessor 308. An additional DC offset correction algorithm may be implemented to reduce overreach errors from decaying exponential transients. During the process, the sum of squares of the inputs are accumulated to provide RMS values of current and voltage. The Fourier coefficients and sums are also calculated for computing the phase angles. The sum of squares and the sums of the Fourier coefficients are updated for each sample, using information from the previous samples to provide a full cycle of data.

In a preferred embodiment, 8 states are provided per cycle for a sampling rate of 8 samples per cycle. Movement from state to state is controlled by a timer which is loaded with a state time at the beginning of the state. The code executed within a state should be completed before the timer expires. The software then waits for the timer to time out. The loop illustrated in FIG. 2 is thus repeated 8 times per power cycle. Most functions are performed all of the time in the background mode as shown. However, many of the checks at steps 224–228 are preferably broken into small parcels so that the whole complement of tasks is performed over a one-cycle period. Some of the checks may be performed more than once per cycle.

As noted above, fault mode is entered when a current or voltage disturbance is detected on the power line at step 220. The prefault current and voltage phasors and RMS quantities are saved for display and phase selection purposes. In particular, upon entry into the fault mode, the sums of the Fourier coefficients and sum of squares from the background mode are stored. As will be described below, new sums are obtained using fault data to which offset compensation has been applied. Data sampling and conversion are continued in the fault mode. A DC offset compensation algorithm also may be implemented for the current signals. Typically, servicing of the operator interface is suspended to allow time for the additional computation necessary for high-speed tripping. If no fault is present, the MDAR relay remains in fault mode for only three cycles. This 50 millisecond interruption of service to the front panel is typically not noticeable by the operator.

Following operation of the fault detectors and entry into the fault mode, the MDAR relay remains in fault mode for at least three cycles. The conditions for exiting fault mode require that none of the instantaneous, Zone 1, or pilot protection qualified outputs are operated and that the RMS values of the currents and voltages are not changing by more than 12%. When these conditions are met the MDAR relay returns to background mode.

To speed up tripping for severe faults, restricted fault testing is implemented at step 232. In restricted fault testing, the last half cycle of background mode input samples and the first half cycle of fault mode input samples are used to compute the current and voltage vectors and RMS values. No DC offset compensation is performed. High-set instantaneous overcurrent and Zone 1 and pilot distance unit tests are executed at step 234 to speed up tripping by as much as one cycle for very high current, close-in faults.

A standard test path is also provided at step 236 which processes 8 post-fault samples (sample #3 through sample #10) which fill out a complete data window of the Full Cycle Fourier Algorithm. The impedance values are thus calculated in a conventional manner. The distance unit tests for Zone 1 and the pilot zone are then performed at step 238. After processing via either the restricted test path 232 and/or the standard path 236, pilot logic and channel control is implemented at step 240 in accordance with known procedures. It is then determined at step 242 whether a fault has been detected within three cycles, and if not, the algorithm remains in the fault mode and control returns to step 210 via steps 226 and 228. However, if no fault has been detected for three cycles, the algorithm is returned to the background mode at step 244 and control returned to step 210 via steps 226 and 228.

Figure 5:
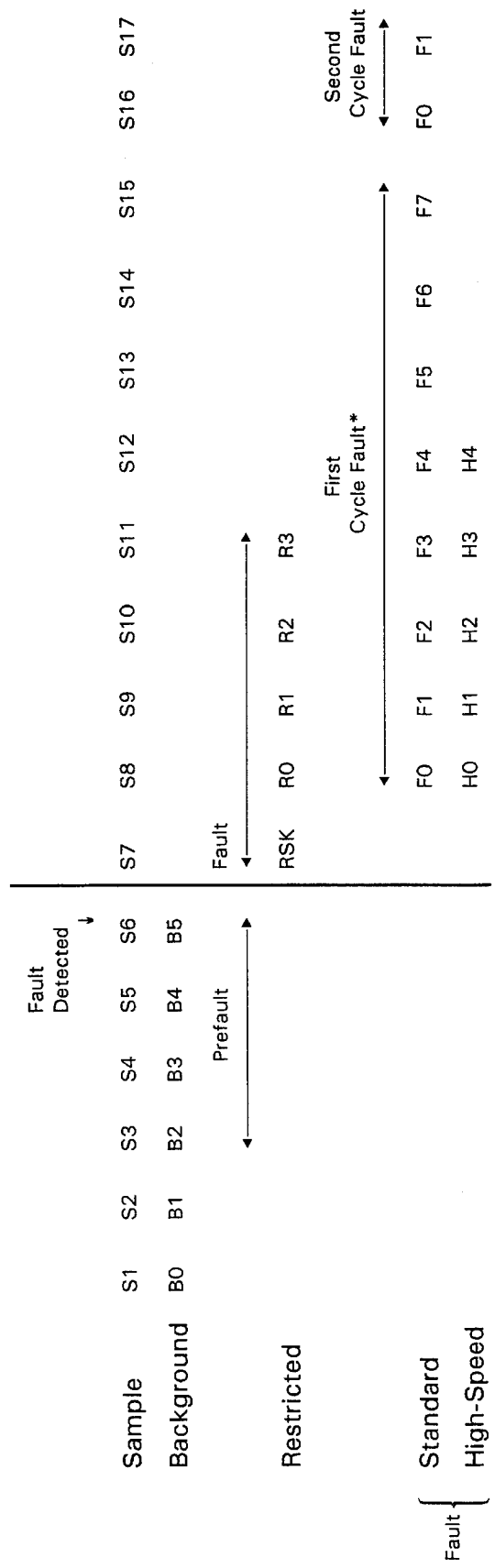
FIG. 5 illustrates a comparison of the trip times required for the restricted, standard and high-speed paths in accordance with the invention.

As noted above, the MDAR relay in accordance with the prior art normally operates in a background mode and switches to the fault mode only when a current or voltage disturbance is detected. An example of the transition from background mode to fault mode shown in FIG. 5. The example starts with five samples of prefault data (S1–S5), and then the fault occurs during the sixth sample (S6). When the fault is detected, the MDAR relay calls a setup routine which prepares for entry into the fault mode by computing the Fourier and sum-of-squares values for the latest four prefault sample frames in the background mode (Samples B1 through B4). The restricted fault mode sums are then computed at step 232 using the values determined for the last four samples in the background mode and the first four samples (half-cycle) in fault mode (Samples R0 through R3). In other words, in the restricted mode, the first four available samples after the fault (R0–R3) are combined with the last four prefault samples (B1–B4) to complete a data "window" for the Fourier algorithm. As illustrated in FIG. 5, the sample during which the disturbance is detected (S6 or B5) and the first sample in the restricted fault mode (S7 or RSK) are not used in the computation for the first full cycle of fault mode. This is to minimize the transient contribution from the fault inception which might cause the relay to overreach.

As also shown in FIG. 5, the standard fault mode values are computed at step 236. As illustrated, the standard test path uses the first full cycle of post-fault samples (Samples F0–F7) to perform the standard distance to fault calculation.

Figure 4:
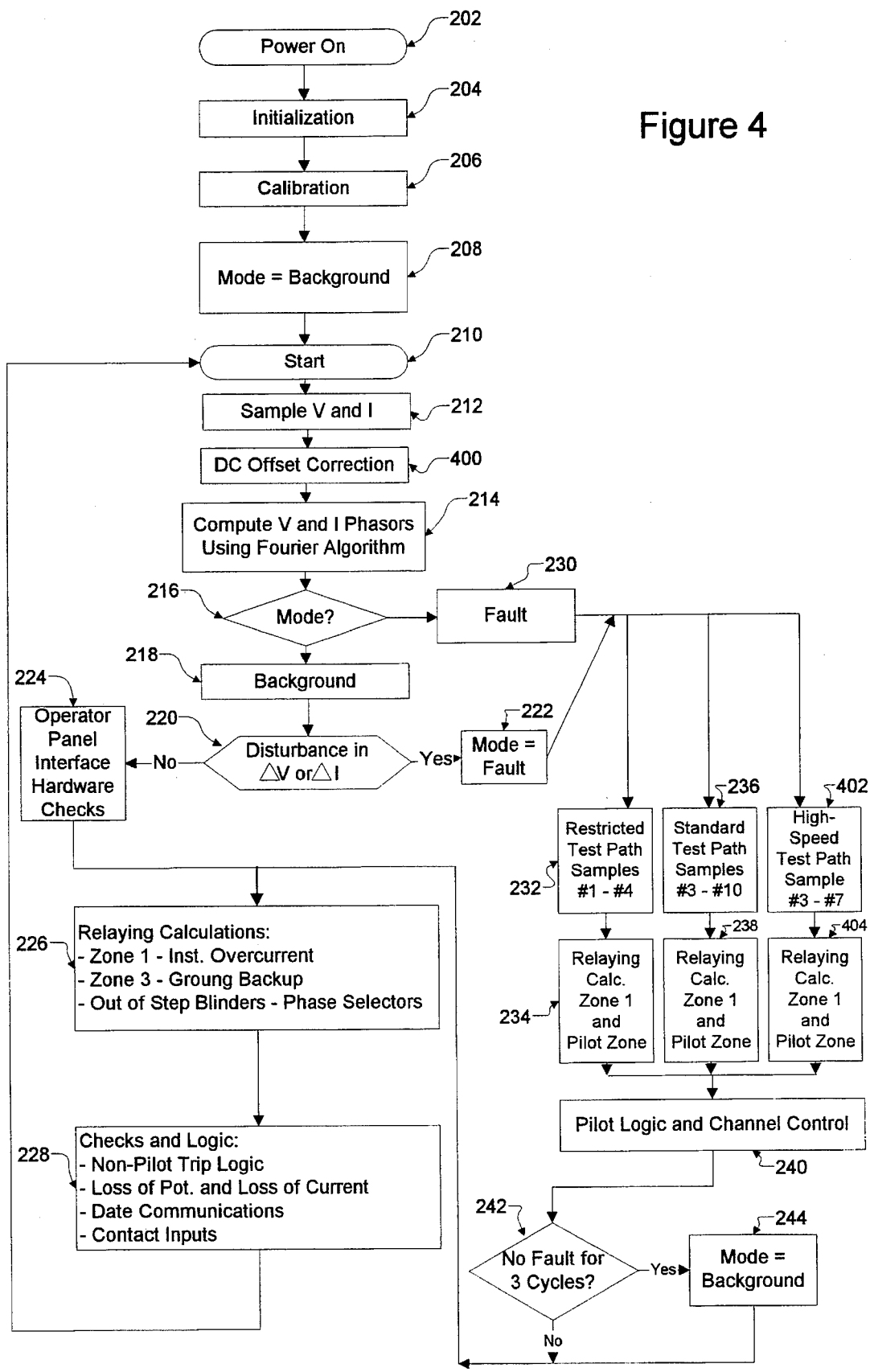
FIG. 4 illustrates an algorithm for operation on the microprocessor of FIG. 3 which implements a high-speed test path in accordance with the techniques of the invention.

In accordance with the invention, the algorithm of FIG. 2 is modified to provide DC offset correction at step 400 and to include a third, high-speed, test path 402 including the Zone 1 and pilot zone calculation of step 404 as illustrated in FIG. 4. The algorithm illustrated in FIG. 4 otherwise substantially corresponds to that illustrated in FIG. 2. Operation of the DC offset correction and the high-speed test path in accordance with the invention will now be described.

As noted above, the Full Cycle Fourier Algorithm is implemented in the standard mode to extract the fundamental power line frequency (50 Hz or 60 Hz) phasor components from the current and voltage samples. The rectangular phasor components of the voltage waveform are generally derived in accordance with the following equations:

$$V_S = \frac{2}{N} \sum_{K=1}^{N} V_K \text{SIN}(2\pi \cdot K/N)$$

$$V_C = \frac{2}{N} \sum_{K=1}^{N} V_K \text{COS}(2\pi \cdot K/N)$$

where $V_k = V_1, V_2, \ldots, V_N$, are the N equally spaced samples (N=8 in the illustrated embodiment) of the voltage waveform taken over one power line cycle. The result is the voltage phasor $V = V_c + jV_s$, where j indicates the complex value. The actual implementation of the phasor computation in a preferred embodiment uses look-up tables for the sine and cosine terms. Each of the eight analog input samples are multiplied by a sine factor and a cosine factor and summed.

These equations may be implemented with any appropriate window of data samples. As noted above, a restricted test path which use samples before and after the fault as well as a standard test path using a full window of samples taken after the fault have been inserted into these equations to determine whether the indicated fault is in the protection zone of the circuit breaker. However, in accordance with the invention, a third path or "high-speed" test path is provided which can be used in parallel with those paths in order to provide a faster and more accurate trip signal for those cases in which the restricted path provides an indeterminate output.

In accordance with the invention, after the MDAR relay senses a current or voltage disturbance, it enters into the restrict mode as described above. The MDAR relay discards the first and second samples after the fault (S6 and S7) to allow for the filtering of the power line signal. Typically, the MDAR relay takes samples #3 through #6 after the fault (S8–S11) to perform the computation in the restricted mode and takes samples #3 through #10 after the fault (S8–S15) to perform the computation in the fault mode using the standard test path. However, in accordance with the invention, the "high-speed" test path uses only five samples from #3 to #7 after the fault (S8–S12) to perform the distance calculation. If the amplitudes of the samples #3 through #7 are defined as A3 to A7, respectively, then the first four samples A3 to A6 may be used for the amplitude measurement which contains AC and DC offset components, while sample A7 may be used for the DC cancellation.

In the high-speed mode, the DC offset voltage (or current) can be expressed by $V_{dc}$ which is $V_{dc}=A3-(A3-A7)/2$. This DC offset correction is performed at step 400 of FIG. 4 once the background loop has taken samples #3 through #7 at step 212. The actual DC components of samples #3 through #6 should thus be $(A3-V_{dc})$, $(A4-V_{dc})$, $(A5-V_{dc})$ and $(A6-V_{dc})$. These DC corrected values are then used to calculate four artificial samples a7 to a10 in accordance with the invention for filling out the data window of the Full Cycle Fourier Algorithm.

In particular, artificial samples a7 to a10 are constructed from the DC adjusted samples A3–A6 (i.e., $A3-V_{dc}$ through $A6-V_{dc}$) by delaying the samples A3–A6 by a half cycle and multiplying the amplitudes by −1 in accordance with symmetry considerations for the waveform of the power signal. For example, if the amplitudes of samples #3 to #7 are:

A3=11.19
A4=12.85
A5=8.74
A6=1.26
A7=−5.19, then the DC offset voltage for these samples can be calculated as:

$$V_{dc}=A3-(A3-A7)/2=11.19-[11.19-(-5.19)]/2=3.$$

Accordingly, the following 8 samples would be used in accordance with the invention to provide a complete data window to the Full Cycle Fourier Algorithm:

A3=8.19
A4=9.85
A5=5.74
A6=−1.74
a7=−8.19
a8=−9.85
a9=−5.74
a10=1.74.

The present invention thus recognizes the symmetry of the sine wave of the voltage and current signals in order to provide a quick estimate of the values of the full cycle waveform. In this manner, a full window of samples may be filled after only N/2+1 samples have been taken, where N is the number of samples taken per cycle of the power signal.

Thus, in accordance with the invention, the basic mathematical expression of the Full Cycle Fourier Algorithm can be rewritten as follows:

$$V_S = \frac{2}{8} \sum_{K=1}^{4} \left[ V_K - \left( V_1 - \frac{V_1-V_5}{2} \right) \right] \sin\left( 2\pi \cdot \frac{K}{8} \right) +$$
$$\frac{2}{8} \sum_{K=1}^{4} \left[ V_K \left( V_1 - \frac{V_1-V_5}{2} \right) \right] \sin\left( 2\pi \cdot \frac{K+4}{8} \right)$$

which reduces to:

$$V_S = \frac{1}{2} \sum_{K=1}^{4} \left[ V_K - \left( V_1 - \frac{V_1-V_5}{2} \right) \right] \sin\left( \frac{K\pi}{4} \right)$$
$$\frac{4}{N} \sum_{K=1}^{N/2} \left[ V_K \left( V_1 - \frac{V_1-V_{N/2+1}}{2} \right) \right] \sin\left( \frac{K\pi}{N/2} \right)$$

Similarly, the value for $V_c$ can be expressed as:

$$V_C = \frac{1}{2} \sum_{K=1}^{4} \left[ V_K - \left( V_1 - \frac{V_1-V_5}{2} \right) \right] \cos\left( \frac{K\pi}{4} \right)$$
$$\frac{4}{N} \sum_{K=1}^{N/2} \left[ V_K \left( V_1 - \frac{V_1-V_{N/2+1}}{2} \right) \right] \cos\left( \frac{K\pi}{N/2} \right)$$

The resulting vector can thus be defined generically as: $P_x = P_c + jP_s$, where $P_x$ can be $I_a$, $I_b$, $I_c$, $V_{ag}$, $V_{bg}$ or $V_{cg}$ to accommodate the 3-phase current and voltage computations.

Hence, in accordance with the invention, the circuit breaker is tripped as soon as the first reliable trip signal is obtained via either the restricted mode, the standard mode, or the high-speed mode. As illustrated in FIG. 5, a trip signal may be provided in the restricted mode after sample S11 in the event of a close-in fault which has little transients and other noise in the signal. In the standard mode, on the other hand, a reliable trip signal could not be provided until at least sample S15 (F7), which is more than a full cycle after the fault was detected. However, in accordance with the invention, the high-speed mode may provide a reliable trip signal after sample S12 or H4, thereby enabling the circuit breaker to be tripped less than a full cycle of the power signal after the detection of the fault. This savings in time in believe to be significant in order to minimize fault current damage to the power transmission hardware attached to the transmission line which received the fault.

Thus, in accordance with the invention, the current or voltage vector can be determined using only N/2+1 samples after the fault, which in the 8 sample per cycle system (N=8) described herein is equivalent to the amplitude of samples A3, A4, A5, A6 and A7, respectively. All vectors of voltages ($V_{ag}$, $V_{bg}$ and $V_{cg}$) and currents ($I_a$, $I_b$, & $I_c$) can be determined at sample #7 after the fault (S12 or H4) in accordance with the invention, which is only approximately 14 milliseconds after the fault for a 60 Hz system. The speed of the MDAR relay thus can be improved from approximately 1.5 cycles to 1 cycle with no deterioration of overreach. As will be appreciated by those skilled in the art, the speed of the relay can be further improved by increasing the sample rate from 8 to 16 samples per cycle and increasing the anti-aliasing filter frequency from 240 from 480 Hz in order to reduce the filter delay time. In such a 16 sample system, sample #12 after the fault would be used for the DC offset cancellation while maintaining a total trip time of approximately 14 milliseconds. However, by increasing the sampling rate, a second microprocessor may be needed to execute all other logic functions for the distance relay.

Although only an exemplary embodiment of the invention has been described in detail above, those skilled in the art will appreciate that many modifications may be made to the invention without departing from the novel teachings and advantages of the invention. Accordingly, all such modifications are intended to be included within the scope of the invention as defined by the appended claims.

I claim:

1. A protective relay apparatus for providing a trip signal to a circuit breaker on a three-phase electrical power transmission line in an AC electrical power transmission system when a fault is detected in a protection zone of the circuit breaker, comprising:

sampling means for providing samples A(1) to A(N) of at least one of voltage and current for each cycle of a power signal on said transmission line; and a processor responsive to said samples A(1) to A(N) for determining whether said fault is in said protection zone and hence whether said circuit breaker should be tripped, said processor implementing a full cycle Fourier algorithm which extracts the fundamental power line frequency phasor components from those samples A(1) to A(N) sampled by said sampling means after detection of said fault, said processor comprising means responsive to said sampling means for (1) providing samples A(1) to A(N/2) sampled by said sampling means after detection of said fault to said full cycle Fourier algorithm as samples A(1) to A(N/2), (2) calculating artificial samples A(N/2+1) to A(N) in accordance with the equation: A(k)=(-1) , A(k-N/2), k=N/2+1 to N, and (3) providing said artificial samples A(N/2+1) to A(N) to said full cycle Fourier algorithm as samples A(N/2+1) to A(N), whereby said processor provides said trip signal to said circuit breaker when said full cycle Fourier algorithm determines from said samples A(1) through A(N/2) and artificial samples A(N/2+1) through A(N) that said fault occurred in said protection zone.

2. An apparatus as in claim 1, wherein said processor operates in background and fault modes, said background mode being the normal operating mode when no fault is present and said fault mode being entered into by said processor when said processor detects a current or voltage disturbance on said transmission line.

3. An apparatus as in claim 2, wherein during said background mode said processor compares samples A(k+N) for a current cycle of said power signal with samples A(k) for a previous cycle of said power signal and determines whether a difference therebetween exceeds a predetermined threshold, and if said difference exceeds said predetermined threshold, said processor determines that a fault is present on said transmission line and enters said fault mode.

4. An apparatus as in claim 3, wherein during said fault mode said processor stays in said fault mode for at least three successive cycles of said power signal and implements said full cycle Fourier algorithm to determine whether said fault detected in said background mode is within said protection zone of said circuit breaker.

5. An apparatus as in claim 4, wherein during said fault mode said processor operates in a restrict mode to determine whether said fault is close to said circuit breaker along said transmission line by implementing said full cycle Fourier algorithm using N/2 samples taken by said sampling means immediately before detection of said fault and N/2 samples taken by said sampling means immediately after said fault and outputs said trip signal if said fault is determined by said full cycle Fourier algorithm to be in said protection zone.

6. An apparatus as in claim 5, wherein during said fault mode said processor further operates in a high speed mode to determine whether said fault is in said protection zone by implementing said full cycle Fourier algorithm using said samples A(1) to A(N/2) sampled by said sampling means after detection of said fault and said artificial samples A(N/2+1) to A(N) calculated from said samples A(1) to A(N/2) and outputs said trip signal if said fault is determined by said full cycle Fourier algorithm to be in said protection zone.

7. An apparatus as in claim 6, wherein during said fault mode said processor further operates in a standard mode to determine whether said fault is in said protection zone by implementing said full cycle Fourier algorithm using said samples A(1) to A(N) sampled by said sampling means after detection of said fault and outputs said trip signal if said fault is determined by said full cycle Fourier algorithm to be in said protection zone.

8. An apparatus as in claim 7, wherein said processor operates concurrently in said restrict, high speed and standard modes by implementing plural versions of said full cycle Fourier algorithm in parallel using samples provided in said restrict, high speed and standard modes.

9. An apparatus as in claim 1, wherein said processor calculates a dc offset component Adc for each sample A(k), prior to calculation of said artificial samples A(N/2+1) to A(N), in accordance with the equation Ado=A(1) - [A(1)-A(N/2+1)]/2, whereby a dc adjusted value for each sample A(k) equals A(k)-$A_{dc}$, where k=1 to N/2.

10. An apparatus as in claim 1, wherein said full cycle Fourier algorithm calculates a phasor P=$P_c$+j$P_s$, where j indicates an imaginary value, and:

$$P_S = \frac{4}{N} \sum_{K=1}^{\frac{N}{2}} \left[ P_K - \left( P_1 - \frac{P_1 - P_{N/2+1}}{2} \right) \right] \text{SIN}\left( \frac{\pi \cdot K}{N/2} \right)$$

$$P_C = \frac{4}{N} \sum_{K=1}^{\frac{N}{2}} \left[ P_K - \left( P_1 - \frac{P_1 - P_{N/2+1}}{2} \right) \right] \text{COS}\left( \frac{\pi \cdot K}{N/2} \right)$$

where P represents each phase of current and voltage of said three-phase electrical power transmission line in said AC electrical power transmission system.

11. A method of digital distance relaying on a three-phase electrical power transmission line in an AC electrical power transmission system, comprising the steps of:

successively sampling a voltage waveform and a current waveform to obtain samples V(1) to V(N) and I(1) to I(N), respectively, for each cycle of a power signal on said transmission line;

electronically detecting the existence of a fault on said transmission line in a background mode from said samples V(1) to V(N) and I(1) to I(N);

upon detection of a fault in said fault detecting step, determining in a fault mode whether said fault is in a protection zone of a circuit breaker of said AC electrical power transmission system by extracting the fundamental power line frequency phasor components from those voltage samples V(1) to V(N) and current samples I(1) to I(N) sampled after detection of said fault in said fault detecting step, comprising the steps of:

providing samples V(1) to V(N/2) and I(1) to I(N/2) sampled after detection of said fault to respective full cycle Fourier algorithms as samples A(1) to A(N/2), calculating artificial samples V(N/2+1) to V(N) and I(N/2+1) to I(N) in accordance with the equations: V(k)=(-1) * V(k-N/2) and I(k)=(-1) * I(k-N/2), where k=N/2+1 to N, and providing said artificial samples V(N/2+1) to V(N) and I(N/2+1) to I(N) to said respective full cycle Fourier algorithms as samples A(N/2+1) to A(N), and running said respective full cycle Fourier algorithms with said samples A(1) to A(N); and providing a trip signal to said circuit breaker when at least one of said respective full cycle Fourier algorithms determine that said fault occurred in said protection zone.

12. A method as in claim 11, wherein said fault detecting step comprises the step of detecting a current or voltage disturbance on said transmission line.

13. A method as in claim 12, wherein said fault detecting step further comprises the steps of comparing voltage samples V(k+N) and current samples I(k+N) for a current cycle of said power signal with voltage samples V(k) and current samples I(k) for a previous cycle of said power signal and determining whether a difference therebetween exceeds a predetermined threshold, and if said difference exceeds said predetermined threshold, entering said fault mode.

14. A method as in claim 13, wherein the step of determining whether said fault is in said protection zone is repeated for at least three successive cycles of said power signal and, if a fault is not found in said protection zone after said three successive cycles, said background mode is entered and said fault detecting step is repeated.

15. A method as in claim 14, wherein the step of determining whether said fault is in said protection zone further comprises the step of determining whether said fault is close to said circuit breaker along said transmission line by implementing said full cycle Fourier algorithm using voltage samples V(1) to V(N/2) and current samples I(1) to I(N/2) taken immediately before detection of said fault and voltage samples V(N/2+1) to V(N) and current samples I(N/2+1) to I(N) taken immediately after said fault.

16. A method as in claim 15, wherein the step of determining whether said fault is in said protection zone further comprises the step of implementing said full cycle Fourier algorithm using said voltage samples V(1) to V(N) and current samples I(1) to I(N) sampled after detection of said fault.

17. A method as in claim 11, wherein the step of determining whether said fault is in said protection zone further comprises the step of calculating a dc voltage offset component $V_{dc}$ for each voltage sample V(k) and a dc current offset component $I_{dc}$ for each current sample I(k), prior to calculation of said artificial samples V(N/2+1) to V(N) and I(N/2+1) to I(N), in accordance with the equations $V_{dc}$= V(1) -[V(1)-V(N/2+1)]/2 and $I_{dc}$=I(1) - [I(1)-I (N/2+1)]/2, whereby a dc adjusted value for each voltage sample V(k) equals V(k)-$V_{dc}$ and for each current sample I (k) equals I (k)-$I_{dc}$, where k=1 to N/2.

18. A method as in claim 11, wherein each full cycle Fourier algorithm calculates a phasor $P=P_c+jP_s$, where j indicates an imaginary value, and:

$$P_S = \frac{4}{N} \sum_{K=1}^{\frac{N}{2}} \left[ P_K - \left( P_1 - \frac{P_1 - P_{N/2+1}}{2} \right) \right] \mathrm{SIN}\left( \frac{\pi \cdot K}{N/2} \right)$$

$$P_C = \frac{4}{N} \sum_{K=1}^{\frac{N}{2}} \left[ P_K - \left( P_1 - \frac{P_1 - P_{N/2+1}}{2} \right) \right] \mathrm{COS}\left( \frac{\pi \cdot K}{N/2} \right)$$

where P represents each phase of current I and voltage V of said three-phase electrical power transmission line in said AC electrical power transmission system.

* * * * *

UNITED STATES PATENT AND TRADEMARK OFFICE
CERTIFICATE OF CORRECTION

PATENT NO. : 5,453,903
DATED : September 26, 1995
INVENTOR(S) : Kung C. Chow

It is certified that error appears in the above-indentified patent and that said Letters Patent is hereby corrected as shown below:

Column 6, line 49, "Ado" should be --$A_{dc}$--.

Column 7, line 53, "$V_{dc}$ = V(1)-IV1I)-V(N/2+1)]/2" should be --$V_{dc}$ = V(1) -[V(1)-V(N/2+1)]/2--

Column 14, line 15,

$$V_S = \frac{1}{2}\sum_{K=1}^{4}\left[V_K - \left(V_1 - \frac{V_1 - V_5}{2}\right)\right]SIN\left(\frac{K\pi}{4}\right)$$
$$\frac{4}{N}\sum_{K=1}^{N/2}\left[V_K\left(V_1 - \frac{V_1 - V_{N/2+1}}{2}\right)\right]SIN\left(\frac{K\pi}{N/2}\right)$$

should be $$V_S = \frac{1}{2}\sum_{K=1}^{4}\left[V_K - \left(V_1 - \frac{V_1 - V_5}{2}\right)\right]SIN\left(\frac{K\pi}{4}\right)$$
$$= \frac{4}{N}\sum_{K=1}^{N/2}\left[V_K - \left(V_1 - \frac{V_1 - V_{N/2+1}}{2}\right)\right]SIN\left(\frac{K\pi}{N/2}\right)$$

UNITED STATES PATENT AND TRADEMARK OFFICE
CERTIFICATE OF CORRECTION

PATENT NO. : 5,453,903
DATED : September 26, 1995
INVENTOR(S) : Kung C. Chow

It is certified that error appears in the above-indentified patent and that said Letters Patent is hereby corrected as shown below:

Column 14, line 7, $$V_S = \frac{2}{8} \sum_{K=1}^{4} \left[ V_K - \left( V_1 - \frac{V_1 - V_5}{2} \right) \right] SIN\left(2\pi \cdot \frac{K}{8}\right) -$$
$$\frac{2}{8} \sum_{K=1}^{4} \left[ V_K \left( V_1 - \frac{V_1 - V_5}{2} \right) \right] SIN\left(2\pi \cdot \frac{K+4}{8}\right)$$

should be $$V_S = \frac{2}{8} \sum_{K=1}^{4} \left[ V_K - \left( V_1 - \frac{V_1 - V_5}{2} \right) \right] SIN\left(2\pi \cdot \frac{K}{8}\right) -$$
$$\frac{2}{8} \sum_{K=1}^{4} \left[ V_K - \left( V_1 - \frac{V_1 - V_5}{2} \right) \right] SIN\left(2\pi \cdot \frac{K+4}{8}\right)$$

UNITED STATES PATENT AND TRADEMARK OFFICE
CERTIFICATE OF CORRECTION

PATENT NO. : 5,453,903
DATED : September 26, 1995
INVENTOR(S) : Kung C. Chow

It is certified that error appears in the above-indentified patent and that said Letters Patent is hereby corrected as shown below:

Column 14, line 25,

$$V_C = \frac{1}{2}\sum_{K=1}^{4}\left[V_K - \left(V_1 - \frac{V_1 - V_5}{2}\right)\right]COS\left(\frac{K\pi}{4}\right)$$
$$\frac{4}{N}\sum_{K=1}^{N/2}\left[V_K\left(V_1 - \frac{V_1 - V_{N/2+1}}{2}\right)\right]COS\left(\frac{K\pi}{N/2}\right)$$

should be $$V_C = \frac{1}{2}\sum_{K=1}^{4}\left[V_K - \left(V_1 - \frac{V_1 - V_5}{2}\right)\right]COS\left(\frac{K\pi}{4}\right)$$
$$= \frac{4}{N}\sum_{K=1}^{N/2}\left[V_K - \left(V_1 - \frac{V_1 - V_{N/2+1}}{2}\right)\right]COS\left(\frac{K\pi}{N/2}\right)$$

Column 15, line 33, "A(k)=(-1) , A(k-N/2)," should be --A(k)=(-1) * A(k-N/2),--

Column 16, line 28, "Ado" should be --$A_{dc}$--.

UNITED STATES PATENT AND TRADEMARK OFFICE
CERTIFICATE OF CORRECTION

PATENT NO. : 5,453,903

DATED : September 26, 1995

INVENTOR(S) : Kung C. Chow

It is certified that error appears in the above-indentified patent and that said Letters Patent is hereby corrected as shown below:

Column 16, line 30, "Adc" should be --$A_{dc}$--.

Signed and Sealed this

Twenty-seventh Day of February, 1996

Attest:

BRUCE LEHMAN

Attesting Officer

Commissioner of Patents and Trademarks